Patented Oct. 26, 1937

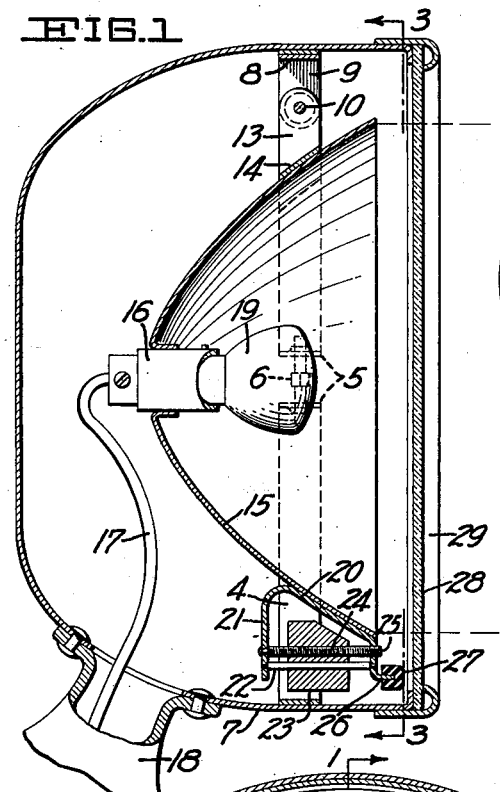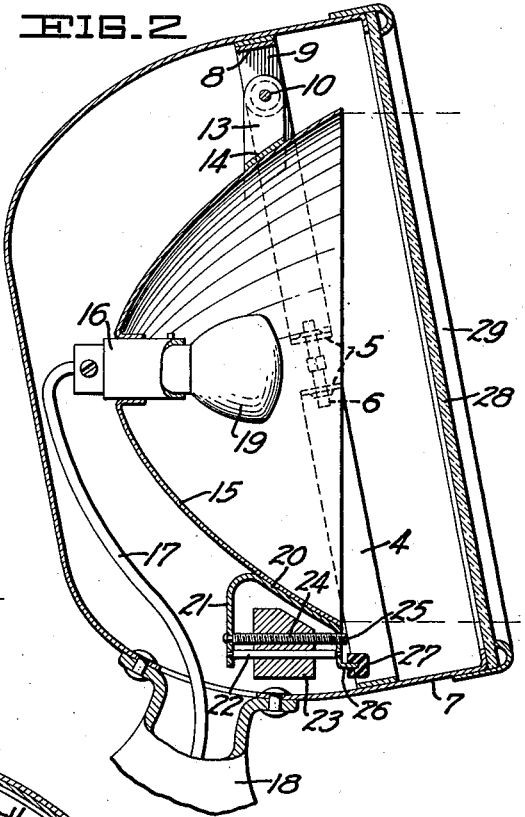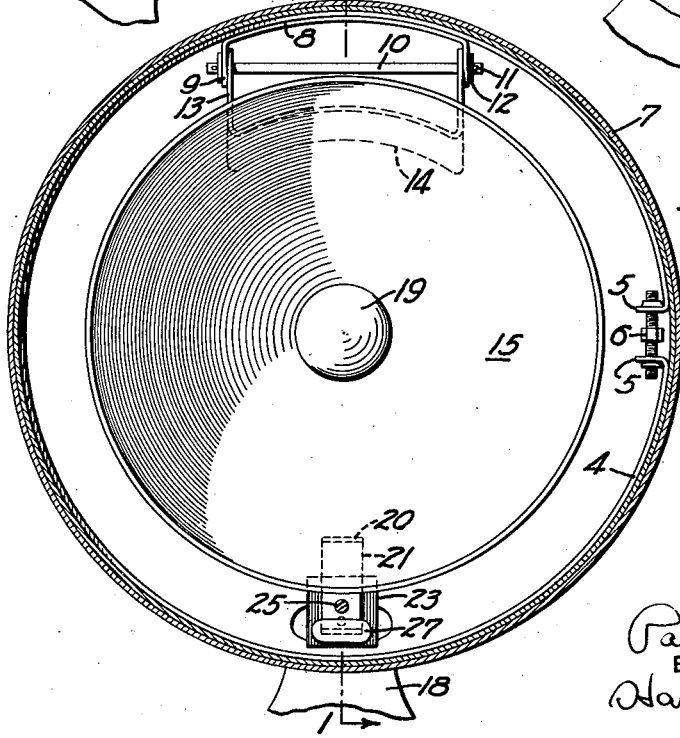

2,096,777

UNITED STATES PATENT OFFICE 2,096,777

SAFETY HEADLIGHT

Paul Astorg, Berkeley, Calif.

Application August 31, 1936, Serial No. 98,688

1 Claim. (Cl. 240—41.6)

This invention relates to light projectors and particularly to those used to illuminate the road in front of vehicles.

The principal object of the invention is to provide a headlight having an automatically tilting light beam which operates, particularly when the vehicle is approaching the summit of an incline, to prevent temporary blinding of the operators of other vehicles crossing the summit of the incline in the opposite direction.

Another object of the invention is to provide, in a headlight in which the light beam is automatically tiltable with respect to the inclination of the road over which the vehicle is being driven, means for governing the degree of tilt of the beam with respect to the inclination of the grade.

A further object of the invention is to provide a unitary mechanism, for automatically tilting the light beam of a vehicle headlight when the vehicle is negotiating an incline, provided with means permitting the attachment of the mechanism to various sizes and shapes of headlight casings.

The invention possesses other objects and features of value, some of which, together with the foregoing, will be set forth in detail in the specification hereunto annexed. It is to be understood that the invention is not to be limited to the particular species thereof shown and described as various embodiments thereof may be employed within the scope of the appended claim.

Referring to the drawing:

Figure 1 is a vertical sectional view of a vehicle headlight incorporating the improvements of my invention. The plane in which the view is taken is indicated by the line 1—1 of Figure 3. Figure 2 is a vertical sectional view, similar to Figure 1, showing the positions of the parts when the headlight casing is tilted. Figure 3 is a vertical sectional view of the headlight, the plane in which the view is taken being indicated by the line 3—3 of Figure 1.

The apparatus of my invention is designed particularly to replace the fixed reflector and lamp mounting of present vehicle headlights and comprises a cylindrical mounting frame 4 formed of a strip of flexible metal and provided at its respective ends with inturned flanges 5, each being apertured and threaded to receive the respective threaded ends of an adjusting screw 6. One end of the screw 6 is provided with a right-hand thread and the other end thereof with a left-hand thread, as is clearly indicated in Figure 3, so that, upon rotation of the screw the flanges 5 may be made to approach or recede from each other so as to decrease or increase the diameter of the mounting frame. It will be apparent that, by inserting the mounting frame in the cylindrical open end of the headlight casing 7 and rotating the screw 6 to spread the flanges 5, the frame will be expanded into secure engagement with the casing. Since the engaging surfaces of both frame and casing are somewhat rough and will provide a connection which may not be readily disturbed, it may be desirable in some instances to provide greater frictional engagement between the parts which may be accomplished either by knurling, or otherwise roughening the outer periphery of the mounting frame, or a thin strip of rubber, or other friction material, may be inserted between the surfaces of the frame and casing.

Secured to the mounting frame 4, in any suitable manner such as by spot welding, is a bracket 8 having its ends turned downwardly to provide a pair of spaced lugs 9 apertured to receive a pivot pin 10 which is secured to the brackets by cotter pins 11 and washers 12; and pivotally supported by the pin 10 is a pair of parallel arms 13 forming part of a bracket 14 which is secured to the parabolic reflector 15. The reflector carries the usual socket 16 connected, by a conductor 17 which passes through the headlight casing support 18, with the light circuit of the vehicle. A lamp 19 is removably mounted in the socket in the well known manner. The reflector, diametrically opposite the bracket 14, is provided with a bracket 20 having a pair of parallel lugs 21 each of which is secured to the respective ends of a guide rod 22 which slidably supports a weight 23. An adjusting screw 24, rotatably secured against axial movement in one of the lugs 21, is threadedly engaged with the weight and is provided with a slotted end 25 so that, upon rotation of the screw, by means of a screw-driver or other suitable tool, the weight 23 may be moved to various positions along the guide rod 22. The front lug 21 of the bracket 20 is provided with an extension 26 upon which is mounted a rubber bumper 27.

It will be seen, in Figures 1 and 2, that the reflector with all of its attached parts is pivotally movable about the axis of the pin 10, and it will also be seen that the position of rest of the reflector, when the axis of the headlight casing is horizontal, may be varied by shifting the weight 21 along the guide rod 22 so as to change the center of gravity of the reflector. The upward inclination of the axis of the reflector, and also the light beam projected thereby, with respect to the axis of the headlight casing, is limited by the rubber bumper 27 which will, after only slight movement of the reflector to elevate the beam, contact the lens 28, which is mounted on the headlight casing in the usual manner by the lens retainer ring 29, so that elevation of the beam beyond the legal limit is prevented.

The headlight of my invention possesses utility, particularly for reducing glare by preventing the projection of light rays therefrom into the eyes of the operator of a vehicle crossing the summit of an incline when the first vehicle is approaching the summit in the opposite direction. As is well known by motorists the common type of headlight, whose reflector is fixed to project a light beam substantially parallel with the surface of the road, causes considerable annoyance, and sometimes temporary blindness resulting in serious accidents, to the operators of approaching vehicles, particularly when the vehicles are crossing the summits of grades. This is occasioned by the light beams of the vehicle ascending the grade, when the former is within a certain distance of the summit of the latter, being projected in a plane tangent to the curvature of the summit and directly into the eyes of the operator of a vehicle just approaching or crossing the summit. The interval in which the eyes of the approaching driver are subjected to this blinding glare depends on the relative speeds of the two vehicles, the slower the speeds the longer the glare will persist, and the greater the speeds the shorter will be the interval but, in the latter case, the greater will be the likelihood that any swerving of either vehicle will cause a possible serious collision.

The headlight of my invention materially reduces this glare by automatically tilting the light beam downwardly as the vehicle is negotiating the incline and rendering the interval when the beam tangentially crosses the summit of the incline extremely short. This is best illustrated in Figure 2 in which the headlight casing is tilted upwardly to indicate that the vehicle is climbing an incline and the reflector, under the influence of gravity, has retained its normal position so that its axis and the axis of the headlight casing, which normally substantially coincides therewith, are disposed in angular relation and the angle of the light beam with respect to the surface of the road is increased, resulting in the illumination of the road closer to the front of the vehicle. It will thus be evident that the beam will not cross the summit of the incline until the vehicle has approached very closely thereto and will therefore not cause glare in the eyes of the drivers of approaching vehicles.

Another desirable feature which this construction affords is that the beam, being focused on the road closer to the vehicle than the usual fixed beam, serves to illuminate the road beyond the summit of the incline. The fixed beam mentioned does not accomplish this since it is projected angularly upwardly from the surface of the road as the vehicle crosses the summit and is not lowered until the vehicle passes beyond the summit.

In addition to the above features the particular construction of my invention permits, by shifting the weight 23 along the guide rod 22, to adjust the angle of the light beam with respect to the level of the road, when the vehicle is horizontal, without loosening and tilting the headlight casing which is the usual procedure.

From the foregoing description, of the preferred form of my invention, it will be seen that I have provided a mechanism which may be inserted and mounted in a great variety of headlight casings of various shapes, that I have provided means whereby the setting of the angle of the light beam, with regard to the surface of the road so as to satisfy local legal requirements, may be quickly and easily accomplished, and that I have succeeded in providing a headlight which does not produce the annoying and dangerous glare of the majority of headlights now in general use.

I claim:

In combination, a headlight casing having a circular recess therein, a strip of flexible material formed in a loop, with adjoining ends, disposed within said recess, each end of said strip having an aperture therein, a member connecting the ends of said strip together, said member having oppositely threaded portions threadedly engaging the apertures of said strip whereby, when said member is rotated said ends of the loop will be separated to expand the diameter of the loop into contact with said casing, a pivot pin supported on said loop, a concave reflector, a bracket secured to said reflector and having arms extending therefrom pivotally connected with said pin whereby said reflector is supported for oscillatory movement about the axis of said pin, a second bracket secured to said reflector at a point diametrically opposite said first bracket, said second bracket having a pair of depending arms, a rod secured to each of said arms, a block of material slidably mounted on said rod, a screw rotatably secured at one end thereof to one of said arms, said screw being in threaded engagement with said block whereby, upon rotation of said screw, said block may be moved along said rod, and a resilient bumper carried by said second bracket and engageable with a portion of said casing, when said reflector is moved about the axis of said pivot pin, for limiting the movement of said reflector relative to said headlight casing in one direction.

PAUL ASTORG.